US011739948B2

(12) United States Patent
Ghiglieri et al.

(10) Patent No.: US 11,739,948 B2
(45) Date of Patent: Aug. 29, 2023

(54) AUTOMATIC OVEN WITH HUMIDITY SENSOR

(71) Applicant: WHIRLPOOL CORPORATION, Benton Harbor, MI (US)

(72) Inventors: Giulio Ghiglieri, Milan (IT); Marco Giuliani, Cassinetta (IT); Davide Parachini, Cassano Magnago (IT); Cristiano Vito Pastore, Camerio (IT)

(73) Assignee: Whirlpool Corporation, Benton Harbor, MI (US)

( * ) Notice: Subject to any disclaimer, the term of this patent is extended or adjusted under 35 U.S.C. 154(b) by 399 days.

(21) Appl. No.: 16/913,211

(22) Filed: Jun. 26, 2020

(65) Prior Publication Data

US 2020/0326075 A1    Oct. 15, 2020

Related U.S. Application Data

(62) Division of application No. 15/702,331, filed on Sep. 12, 2017, now Pat. No. 10,731,869.

(51) Int. Cl.
| | |
|---|---|
| *F24C 15/32* | (2006.01) |
| *G05D 27/02* | (2006.01) |
| *F24C 7/00* | (2006.01) |
| *G01N 25/56* | (2006.01) |
| *G01N 27/04* | (2006.01) |

(52) U.S. Cl.
CPC ............ *F24C 15/327* (2013.01); *F24C 7/002* (2013.01); *F24C 15/325* (2013.01); *G05D 27/02* (2013.01); *G01N 25/56* (2013.01); *G01N 27/048* (2013.01)

(58) Field of Classification Search
None
See application file for complete search history.

(56) References Cited

U.S. PATENT DOCUMENTS

| | | |
|---|---|---|
| 4,717,811 A | 1/1988 | Fujii |
| 4,911,357 A | 3/1990 | Kitamura |
| 6,073,480 A | 6/2000 | Gokhfeld |
| 7,875,834 B2 | 1/2011 | Bujeau et al. |

(Continued)

FOREIGN PATENT DOCUMENTS

| | | |
|---|---|---|
| CA | 1149635 A | 7/1983 |
| DE | 202007010358 U1 | 9/2007 |

(Continued)

OTHER PUBLICATIONS

Machine translation of FR 2849167 A1 performed on Oct. 19, 2022, Bujeau et al. (Year: 2004).*

*Primary Examiner* — Brian W Jennison
*Assistant Examiner* — Kevin Guanhua Wen
(74) *Attorney, Agent, or Firm* — Price Heneveld LLP

(57) ABSTRACT

A method for calculating the humidity level in a cooking apparatus is disclosed. The method includes heating a food load in a cooking cavity of the cooking apparatus and selectively activating a convection fan in the cooking cavity. The method further includes monitoring a humidity signal detected by a humidity sensing apparatus in response to the activation of the convection fan. As a result of the activation of the convection fan, the method may determine an actual humidity level from a plurality of humidity levels based on a change in the humidity signal.

15 Claims, 7 Drawing Sheets

(56) References Cited

U.S. PATENT DOCUMENTS

| | | | |
|---|---|---|---|
| 8,695,487 B2 * | 4/2014 | Sakane et al. | A47J 27/04 99/331 |
| 8,993,934 B2 | 3/2015 | Giazzon et al. | |
| 2002/0149486 A1 | 10/2002 | Lee et al. | |
| 2012/0294992 A1 | 11/2012 | Sager | |
| 2013/0192582 A1 | 8/2013 | Boyer, III et al. | |

FOREIGN PATENT DOCUMENTS

| | | | | |
|---|---|---|---|---|
| DE | 10335295 B4 | 2/2008 | | |
| EP | 0021225 A1 * | 1/1981 | | G01N 27/18 |
| EP | 0078607 A2 | 5/1983 | | |
| EP | 0148162 A2 | 7/1985 | | |
| EP | 1966543 B1 | 10/2011 | | |
| EP | 2469174 A2 | 6/2012 | | |
| FR | 2849167 A1 * | 6/2004 | | F24C 14/005 |
| JP | 57134627 A | 8/1982 | | |
| JP | 5919813 A | 10/1984 | | |
| WO | 2006056305 A1 | 6/2006 | | |
| WO | WO 2017067671 A1 * | 4/2017 | | F24C 7/08 |

* cited by examiner

AUTOMATIC OVEN WITH HUMIDITY SENSOR

CROSS-REFERENCE TO RELATED APPLICATIONS

This application is a divisional application claiming priority to U.S. patent application Ser. No. 15/702,331 entitled AUTOMATIC OVEN WITH HUMIDITY SENSOR, filed on Sep. 12, 2017, by Giulio Ghiglieri et al., the entire disclosure of which is incorporated herein by reference.

BACKGROUND

The present device generally relates to a cooking appliance, and more specifically, to an oven comprising a humidity detection apparatus.

SUMMARY

In at least one aspect, a cooking apparatus configured to detect a humidity level of a cooking cavity is disclosed. The apparatus comprises a cooking cavity comprising a heating element and a humidity sensor configured to output a humidity signal. A controller is configured to heat a food load in the cooking cavity and selectively activate a convection fan configured to circulate air in the cooking cavity. The controller is further configured to monitor the humidity signal in response to the activating of the convection fan and determine an actual humidity level from a plurality of humidity levels based on a change in the humidity signal resulting from the activation of the convection fan.

In at least another aspect, a method for calculating a humidity level in a cooking apparatus is disclosed. The method comprises heating a food load in a cooking cavity of the cooking apparatus and selectively activating a convection fan in the cooking cavity. The method further comprises monitoring a humidity signal detected by a humidity sensing apparatus in response to the activation of the convection fan. As a result of the activation of the convection fan, the method may determine an actual humidity level from a plurality of humidity levels based on a change in the humidity signal.

In at least another aspect, a cooking apparatus configured to detect a humidity level is disclosed. The apparatus comprises a cooking cavity comprising a heating element and a humidity sensor configured to output a humidity signal. A controller is configured to heat a food load in the cooking cavity and selectively activate a convection fan configured to circulate air in the cooking cavity. The controller is further configured to monitor the humidity signal in response to the activating of the convection fan and determine an actual humidity level from a plurality of humidity levels based on a change in the humidity signal resulting from the activation of the convection fan. The controller identifies the actual humidity level to be a first humidity level of the plurality of humidity levels in response to the change in the humidity signal being a positive change and a second humidity level of the plurality of humidity levels in response to the change in the humidity signal being a negative change.

These and other features, advantages, and objects of the present device will be further understood and appreciated by those skilled in the art upon studying the following specification, claims, and appended drawings.

DETAILED DESCRIPTION OF EMBODIMENTS

Figure 1:
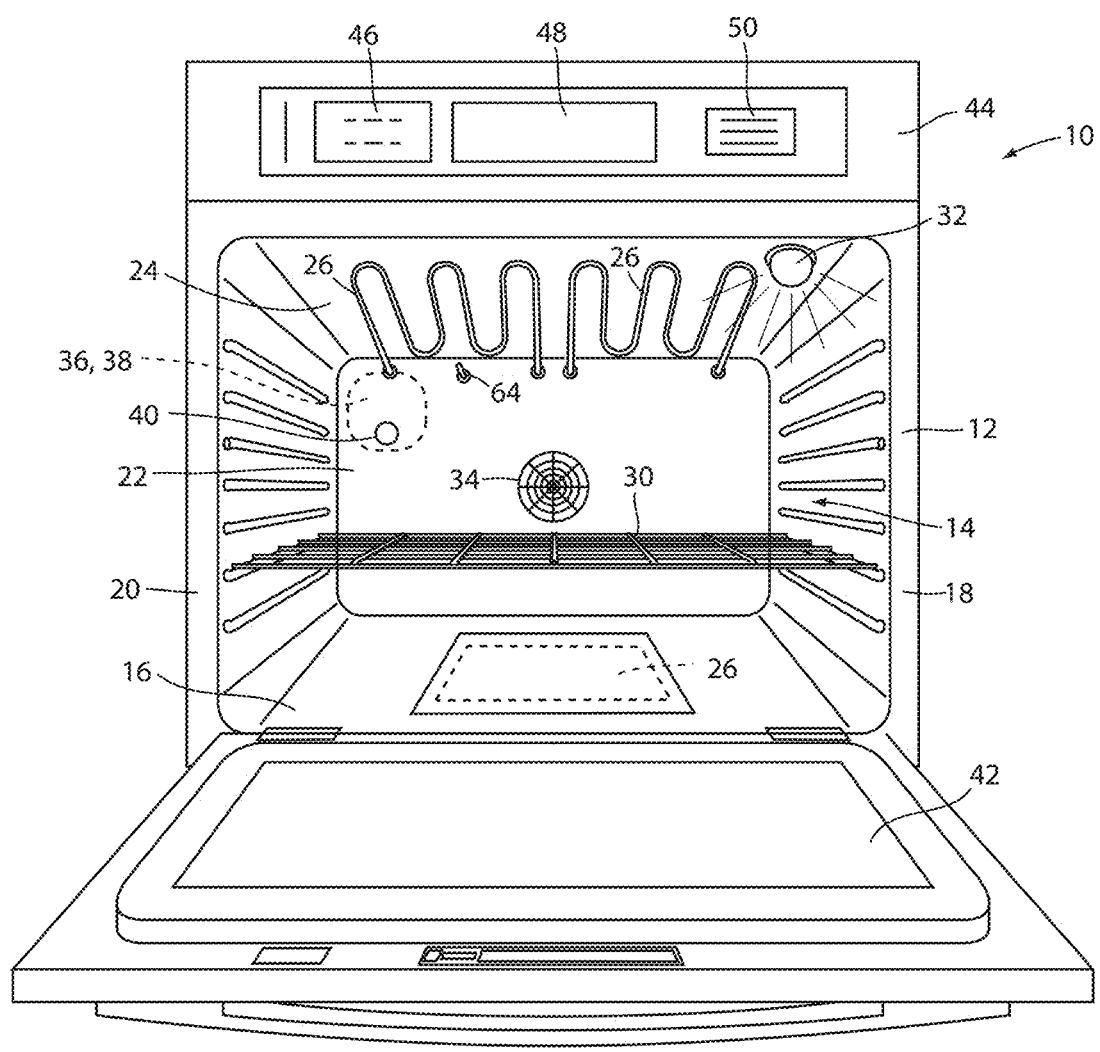
FIG. 1 is a perspective view of an oven comprising a humidity sensor.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In an exemplary embodiment, the disclosure provides for a convection oven with an automatic cooking function based on a detection by an absolute humidity sensor. The humidity sensor may be incorporated as part of a humidity sensing apparatus. The humidity sensing apparatus may be housed in a humidity chamber that may be connected to or extend outward from an exterior surface of a cooking chamber of the oven. As discussed further in the following description, humidity measurements from the humidity sensing apparatus may be monitored by a controller of the oven to determine a cooking state of a food load in the cooking chamber. Accordingly, the disclosure provides for a novel humidity sensing apparatus and various methods for detecting the absolute humidity of the cooking chamber such that the control may provide for a variety of automated cooking functions.

Referring to FIG. 1, there is shown an oven 10. The oven 10 may be a component of a free-standing range or may be embodied as an in-wall oven assembly (or double oven assembly). The oven 10 includes a housing 12 that defines a cooking cavity 14. The cooking cavity 14 includes a bottom wall 16 having a pair of side walls 18, 20 and a back wall 22 extending upward to a top wall 24.

The oven 10 may further include a number of heating elements 26. The heating elements may be positioned adjacent the top wall 24 and/or the bottom wall 16. In the illustrated embodiment, the oven 10 comprises a plurality of heating elements 26 comprising electric broil elements 26*a* as well as bake elements 26*b*. As utilized in conventional cooking ovens, the cooking cavity 14 may further comprise one or more oven racks 30, which may be supported on opposite sides by the side walls 18, 20. The oven may further comprise an oven light 32 configured to illuminate the cooking cavity 14.

One or more convection fans 34 may be incorporated in the oven 10. For example, the convection fans 34 may be disposed in one or more of the walls 16, 18, 20, 22, 24 of the cooking cavity 14. In the illustrated embodiment, the convection fan 34 may be centrally disposed in the back wall 22 and configured to circulate heat from the heating elements 26. In some embodiments, the convection fan 34 may further be configured to cause a change or perturbation of a humidity level in the cooking cavity 14 of the oven 10. Such a perturbation may similarly result in a resulting change in a humidity level in a humidity sensing apparatus 36 housed in a humidity chamber 38 in connection with the cooking cavity 14. The humidity chamber 38 may be connected to or extend outward from an exterior surface of the housing 12.

The humidity chamber 38 of the humidity sensing apparatus 36 may be in fluid connection with the cooking cavity 14 via a sensing port 40. The sensing port 40 may correspond to an opening or hole to be formed in the back wall 22 of the housing 12 connecting the cooking cavity 14 to an interior volume of the humidity chamber 38. In some embodiments, the sensing port 40 may provide for controlled passage of heated air from the cooking cavity 14 into the humidity chamber 38. The sensing port 40 may comprise an actuator 41 or baffle configured to dilate or selectively adjust an effective size or proportion of the sensing port 40. In this configuration, controller 60 may control the actuator 41 to adjust the convection of air and moisture between the cooking cavity 14 and cooking chamber.

The air may be convected between the cooking cavity 14 and the humidity chamber 38 by natural currents resulting from temperature gradients and perturbations or indirect circulating currents driven by the convection fan 34 in the cooking cavity 14. However, in various embodiments, the air transferred between the cooking cavity 14 and the humidity chamber 38 may not be forced or directly driven by a transfer fan or other devices configured to transfer air directly between the cooking cavity 14 and the humidity chamber 38. By avoiding forced convection between the cooking cavity 14 and the humidity chamber 38, the oven 10 may limit or avoid buildup of moisture in the humidity chamber 38, which can result in diminished accuracy or wear of the humidity sensing apparatus 36. In this configuration, the humidity conditions within the cooking cavity 14 may be similarly experienced in the humidity chamber 38 such that the controller 60 may monitor and identify the moisture or humidity level in the cooking cavity 14.

While sharing humidity conditions with the cooking cavity 14, the humidity chamber 38 may be significantly insulated from the cooking temperatures in the oven. Accordingly, the heated air that passes into the humidity chamber 38 may be controlled by the actuator 41 adjusting the proportions of the sensing port 40. Accordingly, the temperature conditions within the humidity chamber 38 may be significantly lower than those in the cooking cavity 14 providing for the humidity sensing apparatus 36 to operate at lower temperatures than the cooking cavity 14. The control of the temperature or limiting of peak temperatures in the humidity chamber 38 may be particularly important during peak heating conditions (e.g., self-cleaning pyrolytic cycles, etc.). The humidity sensing apparatus is discussed in further detail in reference to FIG. 3.

The cooking cavity 14 may be accessed via an oven door 42 coupled to the housing 12. Additionally, an interface console 44 may be located above the oven door 42. The console 44 may include the user-operated controls 46 for operating the oven 10. The controls 46 may comprise tactile keys, membrane switches, toggle switches, buttons, dials, slides or other suitable control mechanisms. In this configuration, a user may utilize the controls 46 to select a food type, cooking configuration, and desired operation (e.g., broiling, baking, etc.) to be executed by the oven 10. The interface console 44 may further comprise a display 48 and an audio device 50. The display 48 may provide a variety of messages, graphical icons, and other indicators to inform the user of the status of the oven 10. The audio device 50 may output audible signals (e.g., a "beep") to alert the user to a condition of the oven 10, or to prompt the user to take an action relating to an operation of the oven 10.

Figure 2:
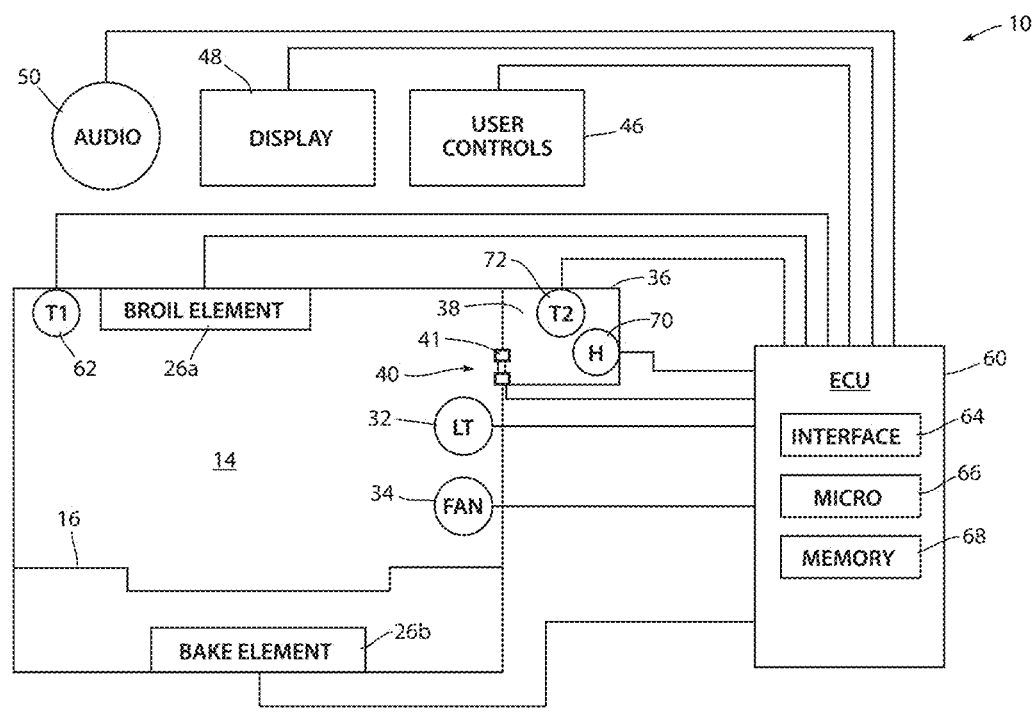
FIG. 2 is a block diagram of an oven comprising a humidity sensing apparatus in a humidity chamber connected to a housing of the oven.

Referring now to FIG. 2, a block diagram of the oven 10 is shown demonstrating a controller 60 configured to control various cooking operations of the oven. The controller 60 is in communication with the controls 46, the display 48, and the audio device 50 to facilitate various programming steps and notifications identifying operations of the oven 10. The controller 60 may further be in communication with the heating elements 26, the convection fan 34, the humidity sensing apparatus 36, and a cooking chamber temperature sensor 62 (e.g., a first temperature sensor) configured to detect a temperature in the cooking cavity 14. In this configuration, the controller 60 may respond to signals from the humidity sensing apparatus 36 and the cooking chamber temperature sensor 62 and control the heating elements 26 and the convection fan 34 to provide desired cooking conditions within the cooking cavity 14.

In general, the controller 60 may be configured to perform computational operations, such as reading data, calculating values, counting elapsed time, executing pre-programmed or automatic cooking programs, and comparing data to predetermined values, either continuously or intermittently, during operation of the oven 10. Accordingly, the controller 60 may comprise a communication interface 64, one or more microcontrollers or processors 66, and a memory device 68, as well as other electronic components commonly utilized in the control of electromechanical systems. The memory device 68 may include a programmable non-volatile storage device (e.g., electrically erasable programmable read-only memory or EEPROM). The memory device 68 may be configured to store and access computerized routines (e.g., firmware or software) executable by the processor 66 and access control parameters used to facilitate one or more automated cooking operations of the oven 10.

The cooking chamber temperature sensor 62 or first temperature sensor 62 may be positioned in or near the cooking cavity 14 of the oven 10. As illustrated, the first temperature sensor 62 is positioned on the back wall 22 of the cooking cavity 14. The first temperature sensor 62 may be sampled by the controller 60 to periodically sense the temperature in the cooking cavity 14 and communicate temperature signals to the controller 60. The first temperature sensor 62 may correspond to a variety of types of temperature probes or sensors. For example, the temperature sensor as discussed herein may correspond to a resistive sensor, such as a Resistance Temperature Detector (RTD) sensor.

The interface 64 of the controller 60 is further in communication with the humidity sensing apparatus 36. The humidity sensing apparatus 36 may be disposed in the humidity chamber 38 in connection with the cooking cavity 14. The humidity sensing apparatus 36 may comprise a humidity sensor 70 and a humidity chamber temperature sensor 72 (e.g., a second temperature sensor). The humidity sensor 70 and a humidity chamber temperature sensor 72 may be configured to communicate a humidity signal and temperature signal indicating the conditions in the humidity chamber 38 such that the controller may utilize the signals to control various cooking functions of the oven 10. The humidity sensor 70 and a humidity chamber temperature sensor 72 (e.g., the second temperature sensor 72) are discussed further in reference to FIG. 3. The oven chamber temperature sensor 62 and the humidity chamber temperature sensor 72 may be referred to herein as the first temperature sensor 62 and the second temperature sensor 72 for clarity. However, it shall be understood that the identifiers of first, second, etc., are for clarity in reference to the specific elements described in the exemplary embodiments of the detailed description and shall not be considered limiting to the scope of the disclosure.

Figure 3:
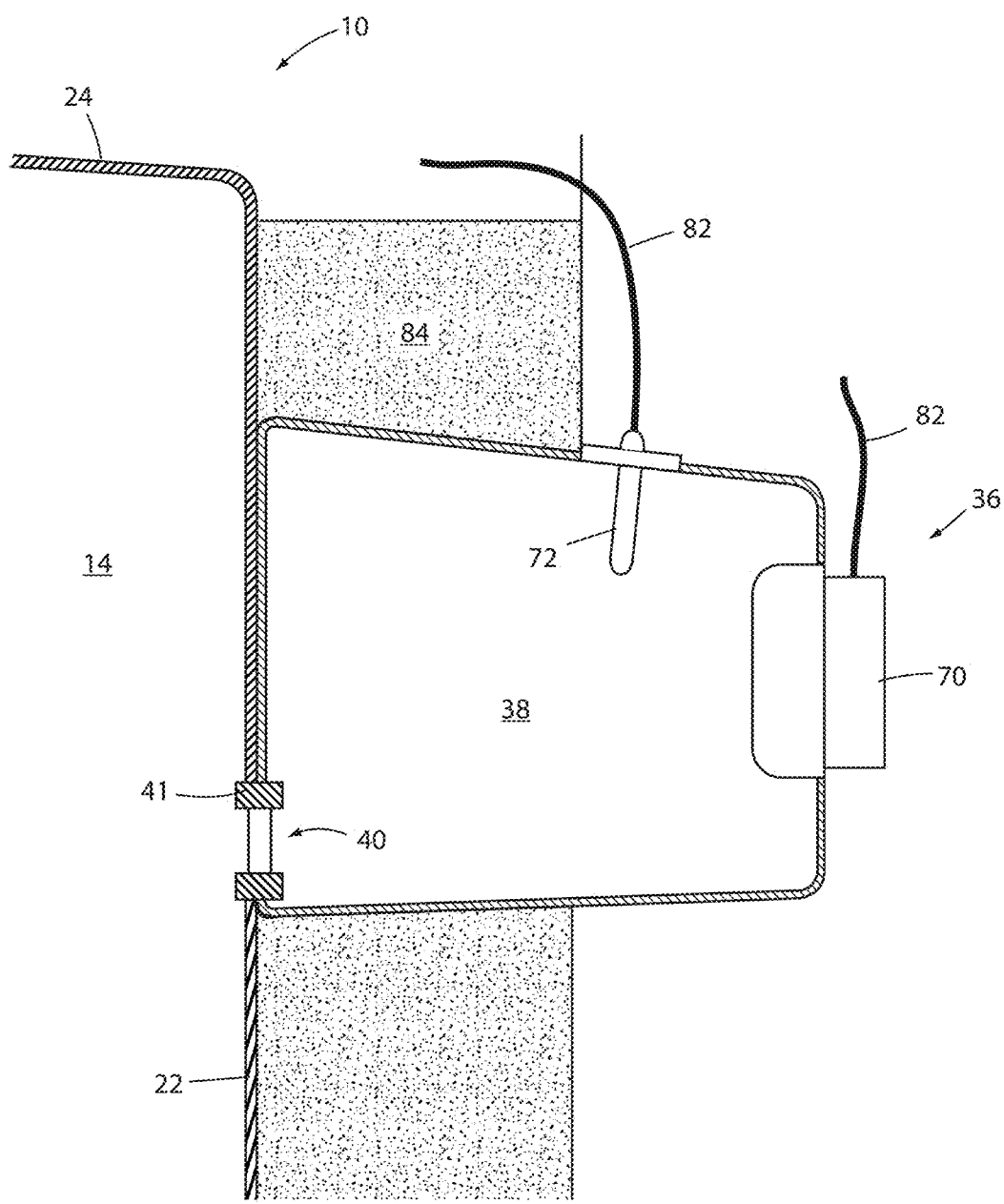
FIG. 3 is a detailed cross-sectional diagram of a humidity chamber connected to a housing of an oven.

Referring now to FIG. 3, a side cross-sectional view of the humidity sensing apparatus 36 is shown in connection with the cooking cavity 14. In some embodiments, the sensing port 40 may provide for controlled passage of air and moisture from the cooking cavity 14 to be communicated into the humidity chamber 38. To measure the moisture in the humidity chamber 38, the humidity sensor 70 may comprise a monitoring circuit in communication with the controller 60 via one or more conductive wires 82. In an exemplary embodiment, the humidity sensor 70 may comprise a plurality of thermistors. In such embodiments, a first thermistor 92a is enclosed in a sealed container with dry air and a second thermistor is exposed to moist air ported from the cooking cavity 14 into the humidity chamber 38 via the sensing port 40. In this configuration, the humidity sensing apparatus 36 is operable to communicate a humidity detection signal to the controller 60 to detect the humidity in the cooking cavity 14. A detailed embodiment including a circuit diagram of the humidity sensor 70 is shown in FIG. 4 and is discussed later.

In an exemplary embodiment, the humidity chamber 38 that houses the humidity sensor 70 may protrude outside an insulation shield 84 or insulation layer of the oven 10 through the back wall 22. The arrangement of the sensor humidity chamber 38 protruding through the insulation shield 84 may provide for the temperature in the humidity chamber 38 to be much lower than temperatures present in the cooking cavity 14. Additionally, in this configuration, the humidity sensing apparatus 36 may not require any forced ventilation into the humidity chamber 38 to reliably monitor the humidity in the cooking cavity 14. Avoiding forced convection may be beneficial in some applications by providing accurate humidity monitoring while maintaining simple and economical construction for the humidity sensing apparatus 36. Additionally, operation without forced convection may limit a risk of condensation in the sensor humidity chamber 38, which may otherwise result due to forced convection causing excessive cooling.

In operation, the difference in temperature between the cooking cavity 14 and the humidity chamber 38 may be identified by the controller 60 by monitoring signals from the first temperature sensor 62 (e.g., the cooking chamber temperature sensor) and the second temperature sensor 72 (e.g., the humidity chamber temperature sensor). As previously discussed, the second temperature sensor 72 may be disposed in the humidity chamber 38 proximate the humidity sensor 70. In this configuration, a controller of the humidity sensing apparatus 36 may detect the chamber temperature in the humidity chamber 38 and approximate the humidity in the cooking cavity 14 based on readings of the humidity sensor 70. The approximation of the humidity in the cooking cavity 14 may be based on a conversion of the humidity identified in the humidity chamber 38 based on the particular design of the oven 10 and the humidity chamber 38. To improve accuracy, the humidity detected by the humidity sensor 70 may be offset by the temperature difference between the sensor humidity chamber 38 and the cooking cavity 14 indicated by the second temperature sensor 72.

Figure 4:
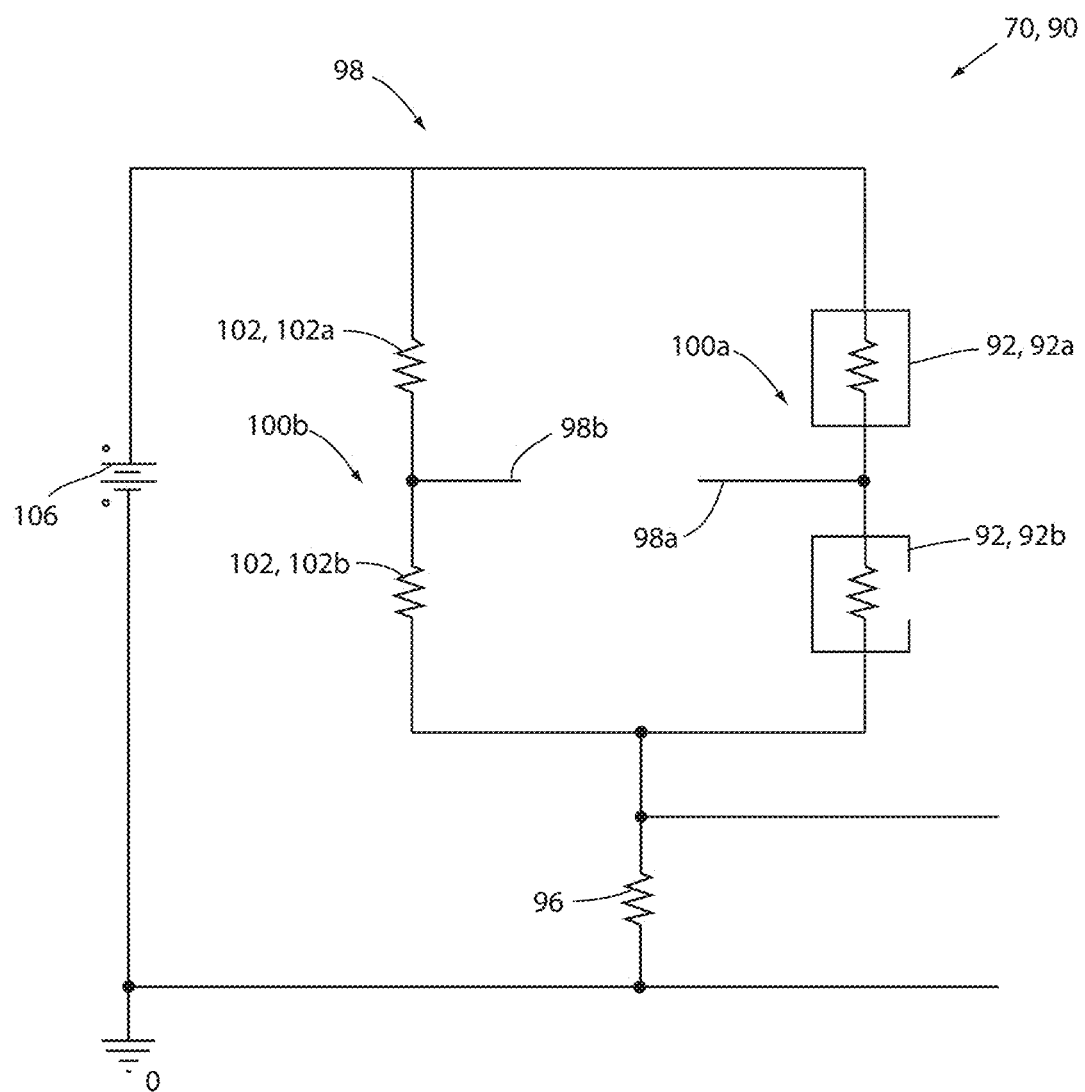
FIG. 4 is a schematic diagram of a monitoring circuit of a humidity sensor of an oven.

Referring to FIG. 4, a circuit diagram of a monitoring circuit 90 forming the humidity sensor 70 is shown. The humidity sensor 70 may be in communication with the controller 60 via the interface 64 and the conductive wires 82. In an exemplary embodiment, the humidity sensor 70 comprises a plurality of thermistors 92 arranged in series. A first thermistor 92a (e.g., a sealed thermistor) may be enclosed in a sealed container with dry air. A second thermistor 92b (e.g., an open thermistor) is exposed to moist air. In this configuration, the controller 60 may monitor the relative temperature of the humidity chamber 38 in dry conditions with the first thermistor 92a and including humidity associated with the cooking cavity 14 with the second thermistor 92b. In this arrangement, the thermistors 92 may be operable to output signals processed by the controller 60 to identify the absolute humidity of the air surrounding the humidity sensor 70.

In operation, the controller 60 detects the absolute humidity based on a transduction physical principle. Accordingly, the identification of the absolute humidity in the humidity chamber 38 may be processed by the controller 60 by comparing the thermal conductivity variation of moist air versus water vapor content. For example, a variation in the absolute humidity in the humidity chamber 38 may cause a variation of the thermal conductivity of moist air. In response to the variation in the thermal conductivity, a heat transfer imbalance may be generated between the two thermistors 92a and 92b. Due to this imbalance, the resulting temperatures of the thermistors 92a and 92b will differ. Based on the difference in the temperatures, the voltage difference between a first and second node (conductive contacts 98a and 98b) of the humidity sensor 70 may be measured by controller 60 via a differential amplifier.

The thermistors 92 may correspond to negative temperature coefficient (NTC) thermistors 92. In this configuration, the thermistors 92 may comprise semiconductor materials configured to effect large changes in resistance in response to small changes in temperature. Accordingly, when incorporated in the monitoring circuit 90, the resistance of the thermistors 92a and 92b may change slightly due to small differences in temperature between the sealed thermistor 92a and the open thermistor 92b. Accordingly, the controller 60 may measure the slight differences in the resistances of the thermistors 92a and 92b via the differential amplifier. The differential amplifier may be incorporated in the controller 60 or one or more additional circuits in connection with the conductive contacts 98a and 98b of a Wheatstone Bridge Circuit 98. A first conductive contact 98a may correspond to a sensor leg 100a. The sensor leg 100a may be in connection with the first thermistor 92a and the second thermistor 92b.

The typical operating temperature of NTC thermistors may be limited to −50° C. to approximately 200° C. Accordingly, by housing the monitoring circuit 90 of the humidity sensor 70 in the humidity chamber 38, the temperature of the humidity chamber 38 may be limited below 200° C. providing for accurate operation of the thermistors 92. In some embodiments, the monitoring circuit 90 of the humidity sensor 70 may further comprise a shunt resistor 96 in connection between at least one of the first thermistor 92a and the second thermistor 92b and a ground of the monitoring circuit 90. In this configuration, the controller 60 may also measure a voltage drop across the shunt resistor 96 via a differential amplifier.

A second conductive contact 98b may correspond to a sensor leg 100b. The sensor leg 100b may be in connection with a plurality of reference resistors 102 (e.g. a first reference resistor 102a and a second reference resistor 102b). The reference resistors 102a and 102b may correspond to have a comparatively high resistance relative to the thermistors 92. For example, the reference resistors 102a and 102b may have a resistance of approximately 20-1000 times the resistance of the thermistors 92a and 92b. In this configuration, a reference voltage of the voltage imbalance between the thermistors 92a and 92b may be measured by the differential amplifier (not shown) of the monitoring circuit 90 connected between conductive contacts 98a and 98b.

The monitoring circuit 90 may further comprise a voltage source 106 in connection with the Wheatstone Bridge Circuit 98. In this configuration, the monitoring circuit 90 may be controlled by the controller 60 to operate as a biasing circuit. The biasing circuit may operate the thermistors 92 at a temperature above the air within the humidity chamber 38. The operating range or working temperature of the monitoring circuit 90 may be configured based on the resistance of the shunt resistor 96, the voltage of the voltage source 106, and the design of the sensing port 40 and the humidity chamber 38 controlling the temperature range in the humidity chamber 38.

Figure 5:
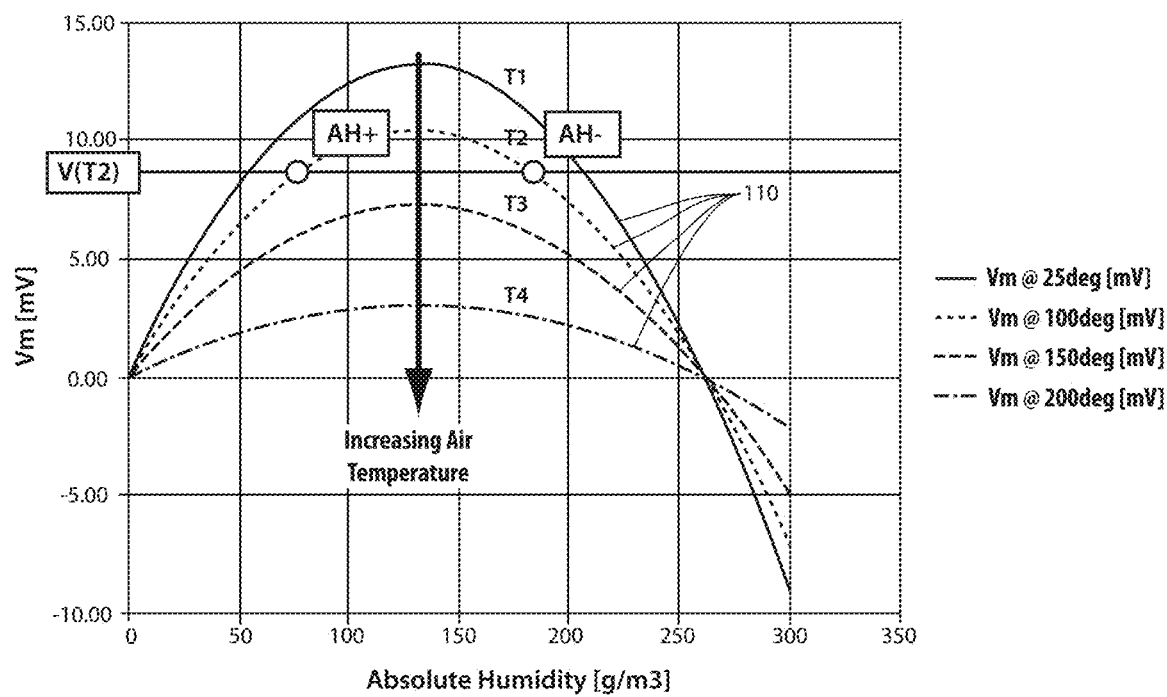
FIG. 5 is a plot of a system response of a voltage output from a humidity sensor.

Referring to FIG. 5, a plurality of characteristic voltage curves 110 of the voltage signal are shown representing the differential voltage $V_m$. The curves 110 demonstrate the system response of the humidity sensor 70 measured between conductive contacts 98a and 98b in response to changes in humidity at various temperatures T. As shown, the increasing air temperature decreases a magnitude of a parabolic shape of the voltage curves 110. The voltage curve 110 may further be represented by equation 1 as follows:

$$AH \pm (V_m, T) = \frac{-b \pm \sqrt{b^2 + 4a\frac{V_m}{cT^2 + dT + e}}}{2a} \quad \text{(Equation 1)}$$

The solutions of Equation 1 model the response of the humidity sensor 70 due to the heat transfer imbalance between thermistors 92a and 92b resulting from the effective humidity difference between the thermistors 92a and 92b. Coefficients a, b, c, d, and e are constants related to the specific design of the electronic components of the monitoring circuit 90 and may be identified based on experimental data. Actual values of the aforementioned coefficients can be characterized by placing one or more sensors inside an environment whose temperature and humidity can be accurately controlled, while the sensors output is recorded. The coefficients of the formula are then obtained by fitting the data to the given formula using available fitting methods. Accordingly, the solution of Equation 1 may form a parabola that links the sensor output $V_m$ and the current air temperature T with two possible absolute humidity solutions AH+ and AH−.

As shown in FIG. 5, the parabolic shape of the voltage curve 110 from Equation 1 results in two possible or potential humidity solutions identifying the absolute humidity AH in the humidity chamber 38 for a single voltage value $V_m$ across the nodes 98a and 98b. Accordingly, the voltage output $V_m$ supplied to the controller 60 may be ambiguous. However, as discussed in reference to FIGS. 6 and 7, a disambiguation method may be applied by the controller 60 to identify the humidity level to which the voltage output $V_m$ relates or indicates from a plurality (e.g. two possible solutions) of potential humidity levels provided by Equation 1. In this way, the controller 60 may quickly and accurately identify if the voltage output $V_m$ corresponds to the first humidity level solution AH+ or second humidity level solution AH−. By identifying the location along the voltage curve 110 that corresponds to the voltage output $V_m$, the controller 60 may accurately identify the actual or true absolute humidity of the humidity chamber 38 and the cooking cavity 14.

Figure 6:
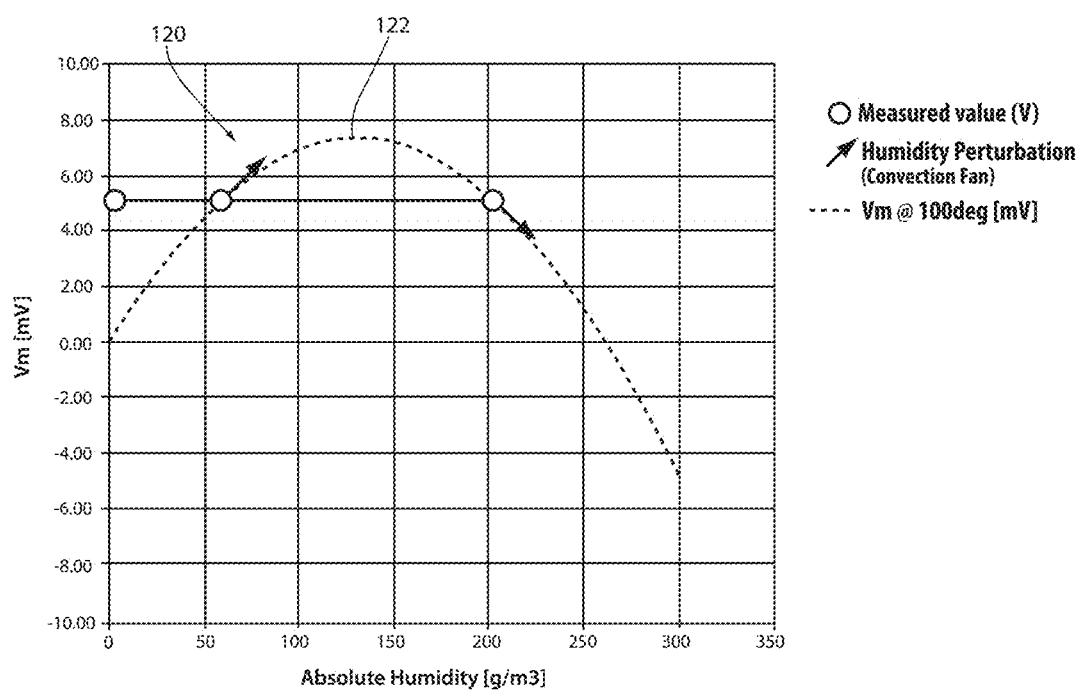
FIG. 6 is a plot of a simulated system response of a voltage output from a humidity sensor in response to a perturbation of a convection fan.
Figure 7:
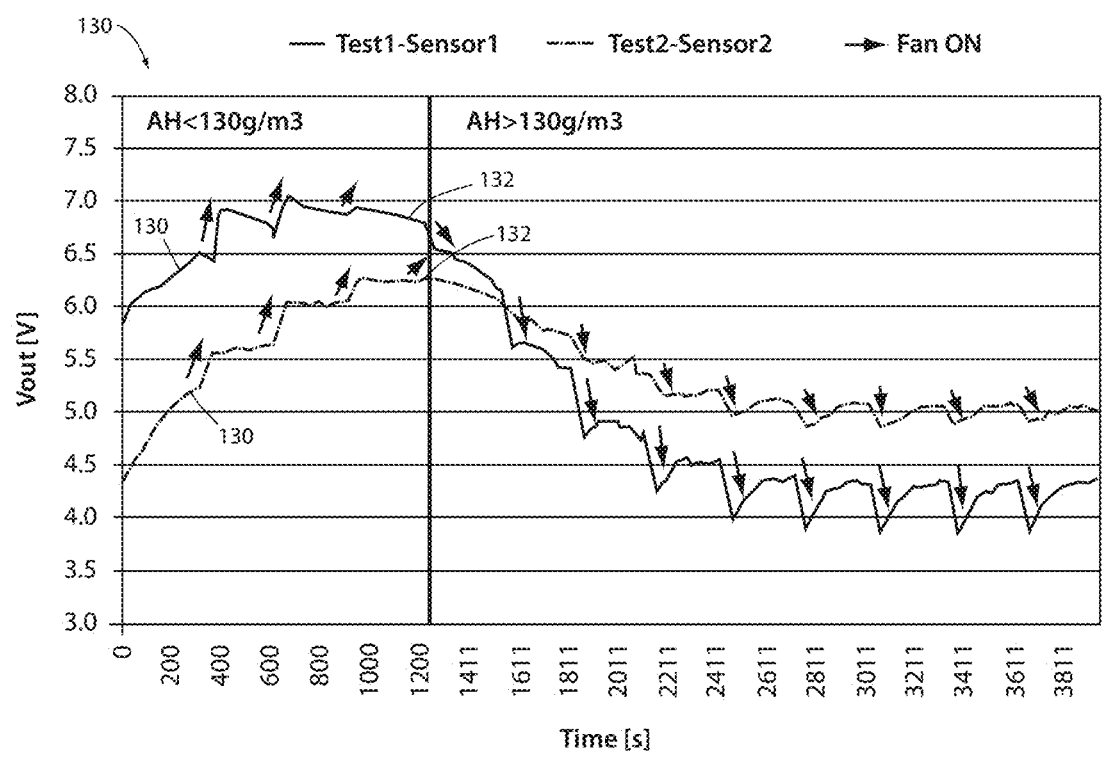
FIG. 7 is a plot of a measured system response of a voltage output from a humidity sensor in response to a perturbation of a convection fan in accordance with the disclosure.

Referring now to FIGS. 6 and 7 a theoretical system response 120 of the voltage output $V_m$ and a measured system response 130 of the voltage output $V_m$ are shown, respectively, demonstrating a disambiguation method for the humidity sensor 70. The controller 60 may apply the disambiguation method to identify whether the absolute humidity indicated by the voltage output $V_m$ corresponds to the first humidity level AH+ or the second humidity level AH−. For example, the disambiguation method may comprise monitoring a change in the voltage output $V_m$ in response to pulsing the convection fan 34 of the oven 10. Following the pulsing of the fan 34, the controller 60 may monitor the response of the humidity sensor 70 for signs of signal variation.

As illustrated in FIGS. 6 and 7, the arrows indicate a change in the voltage output $V_m$ over a range of humidity levels. For each of the arrows shown on the measured response curve 130, the convection fan 34 is activated to perturbate the natural stratification of the humidity in the cooking cavity 14. Accordingly, the pulsing of the convection fan 34 also causes variation in the humidity chamber 38, which is identified in the voltage output $V_m$. When the absolute humidity AH is below a parabolic vertex 122, 132 of a signal response of the humidity sensor 70 (i.e., 130 g/m$^3$), the signal response is positive. The positive change in the voltage signal is shown as an increase or positive change, which is denoted by the upward directed arrows. When the absolute humidity is above the parabolic vertex 122, 132 of the signal response of the humidity sensor 70 (i.e., 130 g/m$^3$), the signal response is negative. The negative change in the voltage signal is shown as a decrease or negative change, which is denoted by the downward directed arrows. Accordingly, the controller 60 may differentiate the humidity reading of the humidity sensor 70 above and below the parabolic vertex 122, 132 to accurately identify and distinguish comparable readings along the response curves 120, 130.

In order to increase the reliability of the humidity variation caused by the perturbation of the convection fan 34, the signal output from the controller 60 may sample the voltage output $V_m$ from the humidity sensor 70 five to thirty seconds after commutation of a state (e.g., OFF to ON or ON to OFF) of the convection fan 34. Additionally, because there is a steeper response of the signal when switching from OFF to ON, in an exemplary embodiment, the signal change from the humidity sensor 70 is assessed across the switch-ON event. In this way, the controller 60 may accurately identify the relative location of the voltage output $V_m$ along the system response curves 120, 130 to accurately identify the absolute humidity in the humidity chamber 38.

Referring again to FIG. 6, the controller 60 may similarly mathematically determine whether the voltage output $V_m$ corresponds to AH+ or AH− without activating or adjusting the operation of the convection fan 34. For example, during a heating process in the oven 10, the controller may monitor the humidity results in the humidity chamber 38 based on the voltage output $V_m$ from the humidity sensor 70. As the cooking cavity 14 increases in humidity during a cooking process, the controller 60 may monitor the voltage output $V_m$. Eventually, if the humidity level exceeds the parabolic vertex 122, voltage output $V_m$ may reach a plateau. In some embodiments, the controller 60 may be configured to distinguish between the plateau caused by crossing the parabolic vertex 122 and a plateau cause by a stabilization of the humidity level.

The controller may distinguish between the plateau caused by crossing the parabolic vertex 122 and a plateau cause by a stabilization of the humidity level based on the first derivative of the voltage output $V_m$. For example, the controller 60 may identify first identify a plateau by identifying that the first derivative of the voltage output $V_m$ is approximately zero. The approximate zero value of the first derivative may indicate that the voltage output $V_m$ is stable not changing. Upon identifying the plateau, the controller 60 may monitor a time period during which the voltage output $V_m$ remains substantially unchanged.

The controller 60 may identify the stable voltage output $V_m$ condition or the parabolic vertex 122 (e.g. the local maximum) of the first derivative based on the voltage output $V_m$ changing less than a predetermined amount for a first predetermined time. For example, the controller 60 may identify the stable condition in response to the voltage output $V_m$ changing less than 5 percent for a first predetermined time of 240 seconds. Specific examples of exemplary times and percentage changes are provided herein for clarity and should not be considered limiting to the disclosure. Accordingly, the controller 60 may first identify the stable or unchanging condition of the voltage output $V_m$ and then identify whether the stable condition is caused by a stabilization in humidity or the crossing of the parabolic vertex 122 along the system response curve 120.

If the controller 60 identifies that the voltage output $V_m$ is unchanged for greater than a second predetermined period of time, the controller 60 may identify the plateau as a stabilization of the humidity level. For example, if after the first predetermined period of time has lapsed, the voltage output $V_m$ does not change greater than 5 percent for a second predetermined period of time (e.g. 180 seconds) the controller 60 may identify that the humidity level has stabilized. Further, if after the first predetermined period of time has lapsed, the voltage output $V_m$ changes greater than 5 percent or significantly decreases within the second predetermined period of time (e.g. 180 seconds) the controller 60 may identify that the plateau corresponded to the parabolic vertex 122. Accordingly, based on the identification of the parabolic vertex 122, the controller 60 may identify future changes in the voltage output $V_m$ indicating the humidity level on the right side of the parabolic vertex 122.

Following the identification of the plateau corresponding to the parabolic vertex 122, the controller 60 may verify the plateau by monitoring the voltage output $V_m$ for a decrease in a rate of change of humidity. By identifying the decrease in the rate of change of the humidity and the voltage output $V_m$, the plateau may be verified or calculated by the controller 60. In this way, the controller 60 may be configured to identify the voltage output $V_m$ from the humidity sensor 70 as corresponding to AH+ while the rate of change of the voltage output $V_m$ is positive. Additionally, the controller 60 may be configured to identify the voltage output $V_m$ from the humidity sensor 70 as corresponding to AH− while the rate of change of the voltage output $V_m$ is negative.

It will be understood by one having ordinary skill in the art that construction of the described device and other components is not limited to any specific material. Other exemplary embodiments of the device disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A method for calculating a humidity level in a cooking apparatus, the method comprising:
   heating a food load in a cooking cavity of the cooking apparatus;
   selectively activating a convection fan in the cooking cavity;
   monitoring a humidity signal detected by a humidity sensing apparatus in response to the activating of the convection fan; and
   determining an actual humidity level from a plurality of measured humidity levels based on a change in the humidity signal resulting from the activating of the convection fan.

2. The method according to claim 1, wherein the determining the actual humidity from the plurality of humidity levels comprises identifying a positive or negative change in the humidity signal in response to the activation of the convection fan.

3. The method according to claim 2, wherein the plurality of humidity levels correspond to a first humidity level and a second humidity level, wherein identifying the actual humidity level as the first humidity level in response to a positive change in the humidity signal occurring due to the activation of the convection fan, and wherein identifying the actual humidity level as the second humidity in response to a negative change in the humidity signal occurring due to the activation of the convection fan.

4. A cooking apparatus configured to detect a humidity level, the apparatus comprising:
   a cooking cavity comprising a heating element;
   a humidity sensor configured to output a humidity signal; and
   a controller configured to:
      heat a food load in the cooking cavity;
      selectively activate a convection fan configured to circulate air in the cooking cavity;
      monitor the humidity signal in response to the activating of the convection fan; and
      determine an actual humidity level from a plurality of measured humidity levels based on a change in the humidity signal resulting from the activation of the convection fan.

5. The cooking apparatus according to claim 4, wherein the controller is further configured to:
   identify a positive or negative change in the humidity signal in response to the activation of the convection fan; and
   in response to the positive or negative change in the humidity signal, determine the actual humidity.

6. The cooking apparatus according to claim 4, wherein the plurality of humidity levels correspond to a first humidity level and a second humidity level.

7. The cooking apparatus according to claim 6, wherein the actual humidity level is identified as the first humidity level in response to a positive change in the humidity signal occurring in response to the activation of the convection fan.

8. The cooking apparatus according to claim 6, wherein the actual humidity level is identified as the second humidity level in response to a negative change in the humidity signal occurring in response to the activation of the convection fan.

9. The cooking apparatus according to claim 4, wherein the controller is further configured to:
   determine the actual humidity level from the plurality of humidity levels based on a rate of change of the humidity signal.

10. The cooking apparatus according to claim 4, further comprising:
    a humidity chamber in connection with the cooking cavity, wherein the humidity sensor is disposed in the humidity chamber, and wherein the humidity chamber is in fluid communication with the cooking cavity via a sensing port.

11. The cooking apparatus according to claim 10, further comprising:
    an insulating layer connected to the housing and disposed between the cooking cavity and the humidity chamber.

12. The cooking apparatus according to claim 4, further comprising:
    a first temperature sensor disposed in the cooking cavity configured to identify a cooking temperature; and
    a second temperature sensor disposed in the humidity chamber.

13. The cooking apparatus according to claim 12, wherein the controller is further configured to:
    calculate a cooking humidity level in the cooking cavity based on the actual humidity level and a temperature difference between the first temperature sensor and the second temperature sensor.

14. The cooking apparatus according to claim 4, wherein the humidity sensor comprises a first thermistor and a second thermistor, wherein the first thermistor is sealed in a container with dry air and the second thermistor is exposed to air in the humidity chamber.

15. A cooking apparatus configured to detect a humidity level, the apparatus comprising:
    a cooking cavity comprising a heating element;
    a humidity sensor configured to output a humidity signal; and
    a controller configured to:
       heat a food load in the cooking cavity;
       selectively activate a convection fan configured to circulate air in the cooking cavity;
       monitor the humidity signal in response to the activating of the convection fan; and
       determine an actual humidity level from a plurality of humidity levels based on a change in the humidity signal resulting from the activation of the convection fan, wherein the actual humidity level is determined to be a first humidity level of the plurality of humidity levels in response to the change in the humidity signal being a positive change and a second humidity level of the plurality of humidity levels in response to the change in the humidity signal being a negative change.

* * * * *